United States Patent [19]
Iu et al.

[11] Patent Number: 6,102,998
[45] Date of Patent: Aug. 15, 2000

[54] INK-JET INKS AND METHOD FOR PRINTING THE SAME

[75] Inventors: Kai-Kong Iu; Leonard Slevin, both of San Diego; William A. Houle, Encinitas, all of Calif.

[73] Assignee: Hewlett-Packard Company, Palo Alto, Calif.

[21] Appl. No.: 09/052,044

[22] Filed: Mar. 30, 1998

[51] Int. Cl.$^7$ .................................................. C09D 11/02
[52] U.S. Cl. ..................... 106/31.58; 106/31.49; 106/31.59; 106/31.78; 106/31.86; 106/31.87; 106/31.89
[58] Field of Search .............................. 106/31.58, 31.86, 106/31.59, 31.49, 31.87, 31.89, 31.78

[56] References Cited

U.S. PATENT DOCUMENTS

| | | | |
|---|---|---|---|
| 4,986,850 | 1/1991 | Iwata et al. | 106/31.58 |
| 5,067,980 | 11/1991 | Koike et al. | 106/31.46 |
| 5,085,698 | 2/1992 | Ma et al. | 106/31.6 |
| 5,169,437 | 12/1992 | You | 106/31.58 |
| 5,180,425 | 1/1993 | Matrick et al. | 106/31.58 |
| 5,254,158 | 10/1993 | Breton et al. | 106/31.58 |
| 5,268,027 | 12/1993 | Chan et al. | 106/31.58 |
| 5,743,945 | 4/1998 | Yamashita et al. | 106/31.58 |

FOREIGN PATENT DOCUMENTS

| | | | |
|---|---|---|---|
| WO 96/22335 | 7/1996 | WIPO | C09B 67/42 |
| WO 97/20000 | 6/1997 | WIPO | C09B 67/42 |

*Primary Examiner*—Helene Klemanski

[57] ABSTRACT

Ink-jet inks and method of printing using the same are provided, the inks comprising at least one colorant and an aqueous vehicle, the vehicle comprising at least one anionic or nonionic surfactant, at least one alkoxylated polyhydroxy organic solvent, at least one water-miscible organic solvent; and optionally, at least one hydantoin compound, and optionally, at least one branched $C_2$–$C_7$ alcohol. The inks enable production of near photographic images having little or no coalescence, excellent waterfastness, and reduced dry time, on a range of print media, in particular, photobase glossy paper.

26 Claims, No Drawings

INK-JET INKS AND METHOD FOR PRINTING THE SAME

FIELD OF INVENTION

The present invention relates to ink compositions suitable for thermal ink-jet printing, and, more particularly, to ink compositions for improving high image quality.

BACKGROUND OF INVENTION

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality. In general, ink-jet print quality still falls short of that produced by more expensive technologies such as photography and offset or gravure printing. A surge in interest in ink-jet imaging (e.g., the rendition of pictures) has resulted in the need to produce near photographic quality printed images at a reasonable cost. The challenge remains to further improve the image quality of ink-jet printed images, without increasing their cost.

An ink-jet image is formed when a precise pattern of dots is ejected from a drop generating device known as a "printhead" onto a printing medium. The typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 $\mu$m×35 $\mu$m. The printhead is held and protected by an outer packaging referred to as a print cartridge, i.e., ink-jet pen.

Upon energizing of a particular resistor element, a droplet of ink is expelled through the nozzle toward the print medium, whether paper, transparent film, or the like. The firing of ink droplets is typically under the control of a microprocessor, the signals of which are conveyed by electrical traces to the resistor elements, thereby forming alphanumeric and other characters on the print medium.

The tight tolerances of the nozzles, typically 30 to 40 $\mu$m diameter require that the ink not clog the nozzles. Further, repeated firings of the resistor elements which must withstand many millions of firings over the life of the ink cartridge to be commercially practical, can result in fouling of the resistor elements and degrading pen performance. This build up of residue on the resistor elements is unique to ink-jet printers and is known as kogation and defined as the build-up of residue (koga) on the resistor surface.

In general, a successful ink for color ink-jet printing must be compatible with the ink-jet pen and printing system. Some of the required properties for the ink-jet ink include: good crusting resistance, the proper viscosity, the proper surface tension, little color-to-color bleed, rapid dry time, consumer safety, minimum coalescence, and low strike through. When the particular ink-jet application also includes special printing, such as imaging and rendition of pictures, such performance attributes are not only important on plain paper but also on special media, such as photobase glossy paper. Furthermore, the ink must be stable over the normal operating and storage temperatures.

Inks are known which possess one or more of the foregoing properties. However, few inks are known that possess all the foregoing properties, since an improvement in one property often results in the degradation of another property. Thus, many inks used commercially represent a compromise in an attempt to achieve an ink evidencing at least an adequate response in each of the foregoing considerations. Accordingly, investigations continue into developing ink formulations which have improved properties and which do not improve one property at the expense of the others. Thus, challenge remains to further improve the image quality of the ink-jet prints without sacrificing pen performance and reliability.

DISCLOSURE OF THE INVENTION

In accordance with the invention, ink-jet inks and method for printing using the same, are provided comprising at least one colorant and an aqueous vehicle, the vehicle comprising at least one anionic or nonionic surfactant, at least one alkoxylated polyhydroxy organic solvent, at least one water-miscible organic solvent; and optionally, at least one hydantoin compound, and optionally, at least one branched $C_2$–$C_7$ alcohol.

The inks formulated according to the present invention exhibit excellent, near photographic image quality on the print medium, in particular, photobase glossy paper. The printed images demonstrate little or no coalescence, excellent waterfastness, and reduced dry time.

DETAILED DESCRIPTION OF THE INVENTION

The invention described herein is directed to ink-jet inks for printing ink-jet images using commercially available ink-jet printers such as DESKJET® printers, manufactured by Hewlett-Packard Company, of Palo Alto, Calif. The inks enable production of near photographic images having little or no coalescence, excellent waterfastness, and reduced dry time, on a range of print media, in particular, photobase glossy paper.

The inks of the present invention comprise at least one colorant and an aqueous vehicle, the vehicle comprising at least one anionic or nonionic surfactant, at least one alkoxylated polyhydroxy organic solvent, at least one water-miscible organic solvent; and optionally, at least one hydantoin compound, and optionally, at least one branched $C_2$–$C_7$ alcohol.

More specifically, the inks of the present invention comprise at least one colorant and an aqueous vehicle, the vehicle comprising from about 0.1 to about 6 wt % of at least one anionic or nonionic surfactant, from about 0.1 to about 10 wt % of at least one alkoxylated polyhydroxy organic solvent, from about 0.5 to about 30 wt % of at least one water-miscible organic alcohol; and optionally, from about 0.1 to about 10 wt % of at least one hydantoin compound, and optionally, from about 0.1 to about 10 wt % of at least one branched $C_2$–$C_7$ alcohol.

All concentrations herein are in weight percent of total ink composition, unless otherwise indicated. The purity of all components is that employed in normal commercial practice for ink-jet inks.

Surfactant

Surfactants suitably employed in the practice of the invention include anionic and nonionic surfactants. Examples of anionic surfactants include: Sulfonate surfactants such as Sulfosuccinates (Aerosol OT, A196; AY and GP, available from CYTEC) and Sulfonates (Aerosol DPOS-45, OS available from CYTEC; Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxyate surfactants (Tergitol series 15S-5, 15S-7, and 15S-9 available from Union Carbide); and Organosilicone surfactants (Silwet L-77 and L-7608 available from WITCO). These surfactants provide the necessary dot spread on plain paper and special media, such as photobase glossy paper, for providing excellent image quality.

The preferred surfactants have the chemical structure according to Formula I:

Formula I

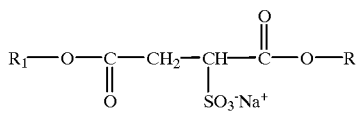

wherein $R_1$ and $R_2$ are independently selected alkyl or aryl groups. Preferably, the alkyl group is $C_4$ to $C_{16}$, and more preferably, $C_5$ to $C_{14}$. The aryl group, preferably, is unsubstituted or alkyl substituted phenyl or naphthalene, and more preferably, a phenyl or naphthalene group having $C_5$ to $C_{14}$ alkyl substitution. Most preferably, $R_1=R_2=$2-ethyl hexane.

The preferred surfactants are available from commercial sources such as CYTEC, West Paterson, N.J., under the tradename Aerosol OT.

The surfactant is present at a concentration from about 0.1 to about 6 wt %, more preferably, from about 0.2 to about 4.5, and most preferably, from about 0.25 to about 3 wt %.

Alkoxyated Polyhydroxy Organic Solvent

The alkoxylated polyhydroxy organic solvents suitable for use in the present invention include, but are not limited to, alkoxylated diols, triols, and tetrols, and their higher homologs; preferably alkoxylated triols. The preferred alkoxylated triol has a glycerin backbone, and most preferably, it is polyalkoxylated. The preferred, alkoxy groups include propoxy and ethoxy groups, with propoxy being the most preferred. The most preferred polyalkoxylated triol has a glycerin backbone with propoxy end groups.

The alkoxylated polyols have a molecular weight (expressed as weight average) in the range from 200 to about 100K, more preferably, from about 200 to about 50K, and most preferably from about 250 to about 10K.

Preferred polyalkoxylated triols have the structure according to Formula II

Formula II

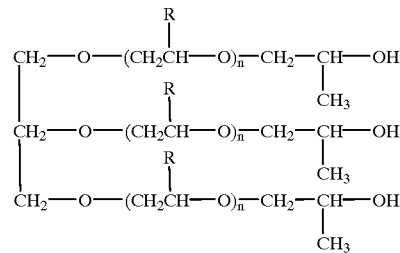

Wherein R is independently selected from the group consisting of H and $CH_3$; and n is from 0 to about 500.

Preferred polyalkoxylated triols having Formula II are available from commercial sources such as those available under the Tradename Multranol-4012 (M.W. about 440) available from BAYER, Pittsburgh, Pa.

The alkoxylated polyhydroxy organic solvent is present in a concentration from about 0.1 to about 10 wt %, more preferably, from about 0.2 to about 7.5, and most preferably, from about 0.5 to about 5 wt %.

Water-Miscible Organic Solvent

Water-miscible organic solvents suitable for use include any organic solvents commonly employed in formulating ink-jet inks. Representative water-soluble organic solvents that may be selected are disclosed in U.S. Pat. No. 5,085,698. Preferred solvents include cyclic amides such as pyrrolidone derivatives (2-pyrrolidone); organic alcohols, preferably polyhydric alcohols, such as diethylene glycol; $C_3$ to $C_8$ diols and triols; and isomers thereof (e.g., 1,4-butanediol, 1,2-butanediol).

The water-miscible organic solvent is present at a concentration from about 0.5 to about 30 wt %, more preferably, from about 1 to about 20, and most preferably, from about 1.5 to about 15 wt %.

Hydantoin Compound

The aqueous vehicle may optionally comprise at least one hydantoin compound according to Formula III:

Formula III

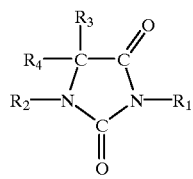

Preferably, $R_1$, $R_2$, $R_3$, and $R_4$ are independently selected from the group consisting of hydrogen, alkyl, and aryl groups.

Most preferably, at least one of $R_1$ and $R_2$ groups is an alkyl having a hydroxy group thereon, preferably ethyl hydroxide; and at least one of $R_3$ and $R_4$ groups is a methyl group.

The most preferred hydantoin is one with $R_1=R_2=$ethyl hydroxide group, and $R_3=R_4=$methyl group; available under the trade name Dantocol DHE from LONZA Inc., Fair Lawn, N.J.

The optional hydantoin, when present, has a concentration from about 0.1 to about 10 wt %, more preferably, from about 0.25 to about 7.5, and most preferably, from about 0.5 to about 5 wt %.

Branched Alcohol

The aqueous vehicle may optionally comprise at least one $C_2$ to $C_7$ branched alcohol, preferably $C_2$–$C_5$. Preferred branched alcohols include tert-amyl alcohol, tert-butyl alcohol, tert-pentyl alcohol, iso-butyl alcohol, and iso-pentyl alcohol.

The optional branched alcohol, when present, has a concentration from about 0.1 to about 10 wt %, more preferably, from about 0.25 to about 7.5, and most preferably, from about 0.5 to about 5 wt %.

Colorants

The inks made according to the present invention comprise at least one colorant, preferably at least one dye. The amount of dye added to the vehicle in prior compositions and the inventive compositions tend to be a function of choice, and is largely dependent upon solubility of the dye in the vehicle and the color intensity of the dye. Typical amounts of dye are between about 0.1 wt % to about 10 wt % of ink composition, preferably, between about 0.1 and 5 wt %. In compositions of the invention, the dye is preferably colored rather than black, although any of the dyes used in inks for ink-jet printers may be employed. Illustrative suitable dyes include Direct Blue 199 (available form Zeneca Colors as Projet Cyan Special), Acid Blue 9; Direct Red 9, Direct Red 227, Magenta 377 (available from Ilford AG, Rue de l'Industrie, CH-1700 Fribourg, Switzerland), Acid Yellow 23, Direct Yellow 132, Direct Yellow 86, Yellow 104 (Ilford AG), Direct Yellow 4 (BASF), Yellow PJY H-3RNA (Zeneca Colors), and Direct Yellow 50 (Zenceca Colors). More preferably, Direct Blue 199, Magenta 377, and Ilford Yellow 104 are employed as the cyan, magenta, and the yellow colorants.

Other Ingredients

The inks of the present invention may optionally comprise components such as buffers, metal chelators, and biocides, as are well known in the art of ink-jet ink formulation.

Buffer

Buffers optionally employed in the practice of the invention to modulate pH can be organic-based biological buffers or inorganic buffers, preferably, organic-based. Further, the buffers employed should provide a pH ranging from about 3 to about 9 in the practice of the invention, preferably about 6.5 to about 8 and most preferably from about 6.7 to 7.1. Examples of preferably-employed buffers include Trizma Base, available from companies such as Aldrich Chemical (Milwaukee, Wis.), 4-morpholineethanesulfonic acid (MES), and 4-morpholinepropanesulfonic acid (MOPS). Most preferably, MES is employed in the practice of the invention.

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

Metal Chelator

Metal chelators optionally employed in the practice of the invention are used to bind transition metal cations that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy)diethylenedinitrilotetraacetic acid (EGTA), or other chelators that can bind transition metal actions. More preferably, EDTA, and DTPA, and most preferably, EDTA in its disodium salt form is employed in the practice of the invention.

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

Biocide

Any of the biocides commonly employed in ink-jet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

INDUSTRIAL APPLICABILITY

The ink formulations are expected to find use in thermal ink-jet printing applications to increase dot gain while maintaining excellent color-to-color bleed alleviation, particularly when using photobase glossy paper.

EXAMPLES

Inks were formulated and different qualities of the formulated inks were measured in an effort to assess the benefits attained in the practice of the invention, namely, color-to-color bleed, mottle, coalescence, waterfastness, and drytime. Print samples of formulated inks, where necessary, were generated using a Hewlett-Packard Photosmart® printer and ink cartridges on either or both HP PhotoSmart glossy Photographic paper, HP part # C5982A, available from Hewlett-Packard, Palo Alto, Calif.; and plain paper.

Inks

A Control ink was prepared comprising 5% 1,4-butanediol; 0.2% of EDTA (metal chelator); 0.2% Proxel GXL (biocide); and 0.2% MES (buffer), and balance water.

A series of inks were prepared according to Table 1. All inks and the Control further comprised from about 0.1 wt % to about 5 wt % of a colorant with the appropriate hue for the selected ink color.

TABLE 1

| INK ID | AQUEOUS VEHICLE ADDITIVE | ADDITIVE % |
|---|---|---|
| Control (C) | 1,4-butanediol, EDTA, Proxel GXL, MES | 5, 0.2, 0.2, 0.2 |
| Dan050 | C + Dantocol DHE | 0.5 |
| Dan150 | C + Dantocol DHE | 1.5 |
| Dan300 | C + Dantocol DHE | 3 |
| Dan500 | C + Dantocol DHE | 5 |
| Dan1000 | C + Dantocol DHE | 10 |
| OT025 | C + Aerosol OT | 0.25 |
| OT050 | C + Aerosol OT | 0.5 |
| OT100 | C + Aerosol OT | 1 |
| OT150 | C + Aerosol OT | 1.5 |
| OT300 | C + Aerosol OT | 3 |
| Mul050 | C + Multranol-4012 | 0.5 |
| Mul150 | C + Multranol-4012 | 1.5 |
| Mul300 | C + Multranol-4012 | 3 |
| Mul500 | C + Multranol-4012 | 5 |
| Mul1000 | C + Multranol-4012 | 10 |
| tAmy050 | C + Tert-Amyl Alc. | 0.5 |
| tAmy150 | C + Tert-Amyl Alc. | 1.5 |

TABLE 1-continued

| INK ID | AQUEOUS VEHICLE ADDITIVE | ADDITIVE % |
|---|---|---|
| tAmy300 | C + Tert-Amyl Alc. | 3 |
| tAmy500 | C + Tert-Amyl Alc. | 5 |
| tAmy1000 | C + Tert-Amyl Alc. | 10 |
| S5T050 | C + Tergitol S-5[1] | 0.5 |
| S5T100 | C + Tergitol S-5 | 1 |
| S5T150 | C + Tergitol S-5 | 1.5 |
| 170FC005 | C + Fluorad 170C[2] | 0.05 |
| 170FC025 | C + Fluorad FC170C | 0.25 |
| 170FC050 | C + Fluorad FC170C | 0.5 |
| 99FC005 | C + Fluorad FC99C[3] | 0.05 |
| 99FC025 | C + Fluorad FC99C | 0.25 |
| 99FC050 | C + Fluorad FC99C | 0.5 |
| YSOT2 | 1,4-butanediol; Dantocol DHE; Multranol-4012; Aerosol OT; MOPS; Proxel GXL | 3.8; 1.6%; 2.0%; 1.1% @ 75% conc.; 0.2%; 0.2% |
| OTAM15 | YSOT2 + Tert-Amyl Alc. | 1.5 |
| OTAM30 | YSOT2 + Tert-Amyl Alc. | 3 |
| OTAM50 | YSOT2 + Tert-Amyl Alc. | 5 |

[1]Secondary alcohol ethoxylate surfactant available from Union Carbide Co.
[2]Non-ionic fluoro surfactant (nonionic fluorinated alkyl POE (Poly OxEthylene) ethanol) available from 3M. (The "C" after the number refers to concentrated form.)
[3]Anionic fluoro surfactant (an anionic amine perfluoroalkyl sulfonate) available from 3M. (The "C" after the number refers to concentrated form.)

Method of Measurement for Image Quality

Image quality was evaluated by measuring at least one attribute, such color-to-color bleed, coalescence, mottle, and overall image quality.

Coalescence, mottle, and overall image quality were evaluated by printing images (containing pictures) using the formulations described in examples below and thereafter evaluating the images for the aforementioned attributes. Attributes affecting overall image quality include, but are not limited to, color quality, dot spread, dot gain, color-to-color bleed, mottle, and coalescence. The coalescence and mottle performance for the inks were ranked relative to one other on a scale of 1 to 10 and the results are listed in Table 2. It is desired that the printed images have low coalescence and mottle.

Color-to-color bleed was evaluated by printing blocks of differing colors, adjacent one another, and thereafter visually inspecting the printed images for the unwanted migration of color from one block to another. The bleed performance for the inks were ranked relative to one other on a scale of 1 to 10 and the results are listed in Table 2. It is desired that the printed images have low bleed numbers.

Method of Measurement for Dry Time

Dry time was evaluated by printing images and measuring the time that it took for the printed image to dry sufficiently such that another printed image could be placed on top of the first printed image without smearing the print. The dry times were ranked relative to one other on a scale of 1 to 10 and the results are listed in Table 2. The lower the dry time number, the less time it took for the printed image to dry. Lower dry times are preferred.

Method of Measurement for Waterfastness

Waterfastness performance for each ink was evaluated by printing blocks of the different colors for each ink. The optical density, OD, of the printed samples were measured using a densitometer according to standard color measurement procedures. The printed samples were then held at an angle and known quantity of water was then dripped across a portion of the printed sample at pre-determined time intervals. The optical density of the transferred dye on the unimaged portion of the paper was then measured. The results are listed in Table 3. Lower optical densities represent less colorant transfer and better waterfastness.

TABLE 2

| Ink ID | Mottle[6] | Bleed[7] | Dry Time[6] | Dry Time[4] | Coalesence[4] |
|---|---|---|---|---|---|
| Control 1 | 7 | 7 | 7 | 6 | 9 |
| Dan050 | 8 | 8 | ND[5] | ND | ND |
| Dan150 | 9 | 9 | ND | ND | 9 |
| Dan300 | 7 | 6 | ND | ND | ND |
| Dan500 | 8 | 5 | ND | ND | ND |
| Dan1000 | 7 | 7 | 10 | ND | 9 |
| OT025 | 7 | 7 | 2 | 8 | 10 |
| OT050 | 7 | 7 | 6 | 7 | 9 |
| OT100 | 8 | 6 | 2 | 6 | 8 |
| OT150 | 4 | 4 | 1 | 5 | 9 |
| OT300 | 3 | 3 | 1 | 6 | 5 |
| Mul050 | 7 | 7 | 7 | ND | 10 |
| Mul150 | 7 | 7 | 6 | 6 | 10 |
| Mul300 | 6 | 6 | 3 | 8 | 10 |
| Mul500 | 5 | 5 | 1 | 9 | 10 |
| Mul1000 | 3 | 3 | 1 | 10 | 10 |
| tAmy050 | 7 | 8 | 8 | 9 | 10 |
| tAmy150 | 7 | 6 | 5 | 5 | 9 |
| tAmy300 | 8 | 5 | 2 | 4 | 7 |
| tAmy500 | 9 | 4 | 1 | 2 | 7 |
| tAmy1000 | ND | ND | ND | 1 | ND |
| S5T050 | 8 | 7 | 7 | 7 | 9 |
| S5T100 | 8 | 8 | 6 | 6 | 8 |
| S5T150 | 9 | 7 | 3 | 6 | 8 |
| 170FC005 | 7 | 7 | 7 | 7 | 9 |
| 170FC025 | 7 | 7 | 7 | 7 | 9 |
| 170FC050 | 8 | 6 | 5 | 8 | 9 |
| 99FC005 | 7 | 5 | 7 | 9 | 9 |
| 99FC025 | 7 | 6 | 7 | 7 | 9 |
| 99FC050 | 8 | 5 | ND | ND | ND |
| YSOT2 | 3 | 3 | 1 | 4 | 4 |
| OTAM15 | 3 | 3 | 1 | 5 | 2 |
| OTAM30 | 3 | 3 | 1 | 4 | 5 |
| OTAM50 | 3 | 3 | 1 | 3 | 4 |

[4]Data measured on photobase glossy paper.
[5]No data.
[6]Data on plain paper.
[7]Average score for plain paper and photobase glossy paper.

TABLE 3

| | Waterfastness (OD)[8] | | | |
|---|---|---|---|---|
| Ink ID | Black | Cyan | Yellow | Magenta |
| Control 1 | 0.42 | 0.33 | 0.25 | 0.26 |
| Dan050 | ND | ND | ND | ND |
| Dan150 | ND | ND | ND | ND |
| Dan300 | ND | ND | ND | ND |
| Dan500 | ND | ND | ND | ND |
| Dan1000 | ND | ND | ND | ND |
| OT025 | 0.42 | 0.27 | 0.28 | 0.26 |
| OT050 | 0.44 | 0.35 | 0.35 | 0.27 |
| OT100 | 0.22 | 0.11 | 0.16 | 0.26 |
| OT150 | 0.05 | 0.08 | 0.06 | 0.08 |
| OT300 | 0.05 | 0.06 | 0.06 | 0.06 |
| Mul050 | 0.43 | 0.37 | 0.26 | 0.21 |
| Mul150 | 0.46 | 0.21 | 0.19 | 0.26 |
| Mul300 | 0.27 | 0.34 | 0.22 | 0.15 |
| Mul500 | 0.05 | 0.06 | 0.24 | 0.09 |
| Mul1000 | 0.04 | 0.16 | 0.07 | 0.16 |
| tAmy050 | 0.43 | 0.39 | 0.31 | 0.37 |
| tAmy150 | 0.44 | 0.41 | 0.26 | 0.18 |
| tAmy300 | 0.42 | 0.29 | 0.24 | 0.22 |
| tAmy500 | 0.32 | 0.2 | 0.34 | 0.18 |
| tAmy1000 | ND | ND | ND | ND |
| S5T050 | 0.43 | 0.36 | 0.33 | 0.33 |
| S5T100 | 0.45 | 0.32 | 0.28 | 0.23 |
| S5T150 | 0.24 | 0.19 | 0.05 | 0.13 |
| 170FC005 | 0.4 | 0.38 | 0.28 | 0.25 |
| 170FC025 | 0.36 | 0.35 | 0.3 | 0.29 |

TABLE 3-continued

| Ink ID | Waterfastness (OD)[8] | | | |
|---|---|---|---|---|
| | Black | Cyan | Yellow | Magenta |
| 170FC050 | 0.41 | 0.32 | 0.3 | 0.4 |
| 99FC005 | 0.47 | 0.41 | 0.3 | 0.26 |
| 99FC025 | 0.35 | 0.31 | 0.21 | 0.29 |
| 99FC050 | ND | ND | ND | ND |
| YSOT2 | 0.03 | 0.04 | 0.03 | 0.07 |
| OTAM15 | 0.03 | 0.03 | 0.03 | 0.04 |
| OTAM30 | 0.04 | 0.09 | 0.03 | 0.09 |
| OTAM50 | 0.04 | 0.07 | 0.05 | 0.06 |

[8]Data on plain paper.

As can be noted from the data in Tables 2 and 3, inks with vehicles made according to the present invention comprising at least one anionic or nonionic surfactant, at least one alkoxylated polyhydroxy organic solvent, and at least one water-miscible organic solvent, demonstrated better overall image quality and waterfastness. Image quality, waterfastness, and dry time were further enhanced when the ink vehicle further comprised at least one hydantoin compound, and at least one branched $C_2$–$C_7$ alcohol.

Thus, it has been demonstrated that inks formulated according to the present invention exhibit excellent, near photographic image quality on the print medium, in particular, photobase glossy paper, the images having little or no coalescence, excellent waterfastness, and reduced dry time.

What is claimed is:

1. An ink-jet ink for ink-jet printing, comprising:
   at least one colorant; and
   an aqueous vehicle, the vehicle comprising
      at least one anionic or nonionic surfactant;
      at least one alkoxylated polyhydroxy organic solvent, wherein the alkoxylated polyhydroxy solvent is an alkoxylated triol;
      at least one water-miscible organic solvent; and
      at least one hydantoin compound.

2. The ink of claim 1 further comprising
   at least one branched $C_2$–$C_7$ alcohol.

3. The ink of claim 1 or 2 wherein the alkoxylated triol is a polyalkoxylated triol with a glycerin backbone and end groups with ethoxy or propoxy functional groups.

4. The ink of claim 1 or 2 wherein the alkoxylated triol has formula II

Formula II $$\begin{array}{l} CH_2-O-(CH_2CH-O)_{\overline{n}}-CH_2-CH-OH \\ \phantom{CH_2-O-(CH_2}R\phantom{H-O)_{\overline{n}}-CH_2-}CH_3 \\ CH_2-O-(CH_2CH-O)_{\overline{n}}-CH_2-CH-OH \\ \phantom{CH_2-O-(CH_2}R\phantom{H-O)_{\overline{n}}-CH_2-}CH_3 \\ CH_2-O-(CH_2CH-O)_{\overline{n}}-CH_2-CH-OH \\ \phantom{CH_2-O-(CH_2CH-O)_{\overline{n}}-CH_2-}CH_3 \end{array}$$

wherein R is independently selected from the group consisting of H and $CH_3$; and n is from 0 to about 500.

5. The ink of claim 1 or 2 wherein the water-miscible organic solvent is selected from the group consisting of cyclic amides, organic alcohols, and $C_3$ to $C_8$ diols and triols, and isomers thereof.

6. The ink of claim 1 or 2 wherein the at least one hydantoin compound has Formula III Formula III $$\begin{array}{c} R_3 \quad O \\ R_4-C-C \\ R_2-N \quad N-R_1 \\ C \\ \| \\ O \end{array}$$

wherein $R_1$, $R_2$, $R_3$, and $R_4$ are independently selected from the group consisting of hydrogen, alkyl, and aryl groups.

7. The ink of claim 6 wherein at least one of $R_1$ and $R_2$ groups is an alkyl having a hydroxy group thereon, and at least one of $R_3$ and $R_4$ groups is a methyl group.

8. The ink of claim 6 wherein $R_1$ and $R_2$ groups are ethyl hydroxide groups, and $R_3$ and $R_4$ groups are methyl groups.

9. The ink of claim 2 wherein the at least one branched $C_2$–$C_7$ alcohol is selected from the group consisting of tert-amyl alcohol, tert-butyl alcohol, tert-pentyl alcohol, iso-butyl alcohol, and iso-pentyl alcohol.

10. The ink of claim 1 wherein
   the at least one surfactant is present in a concentration from about 0.1 to about 6 wt %;
   the at least one alkoxylated polyhydroxy organic solvent is present in a concentration from about 0.1 to about 10 wt %; and
   the at least one water-miscible organic solvent is present in a concentration from about 0.5 to about 30 wt %; and
   the at least one hydantoin compound is present in a concentration from about 0.1 to about 10 wt %.

11. The ink of claim 10 wherein
   the at least one surfactant is present in a concentration from about 0.25 to about 3 wt %;
   the at least one alkoxylated polyhydroxy organic solvent is present in a concentration from about 0.5 to about 5 wt %; and
   the at least one water-miscible organic solvent is present in a concentration from about 1.5 to about 15 wt %; and
   the at least one hydantoin compound is present in a concentration from about 0.5 to about 5 wt %.

12. The ink of claim 10 further comprising at least one branched $C_2$–$C_7$ alcohol wherein
   the at least one branched $C_2$–$C_7$ alcohol is present in a concentration from about 0.1 to about 10.0 wt %.

13. The ink of claim 12 wherein
   the at least one branched $C_2$–$C_7$ alcohol is present in a concentration from about 0.5 to about 5 wt %.

14. An ink-jet ink, comprising:
   at least one colorant; and
   an aqueous vehicle, the vehicle comprising
      at least one sulfonate surfactant having Formula I Formula I

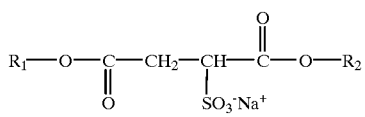

wherein $R_1$ and $R_2$ are independently selected from the group consisting of alkyls and aryls, at least one alkoxylated polyhydroxy organic, wherein the alkoxylated polyhydroxy solvent is an alkoxylated triol; and at least one water-miscible organic solvent.

15. The ink of claim 14 wherein the alkyl group is $C_4$ to $C_6$, and the aryl group is unsubstituted or alkyl substituted phenyl or naphthalene group.

16. The ink of claim 15 wherein the alkyl group is $C_5$ to $C_{14}$, and the aryl group is a phenyl or naphthalene group having $C_5$ to $C_{14}$ alkyl group substitutions.

17. The ink of claim 16 wherein $R_1$ and $R_2$ are 2-ethyl hexane groups.

18. An ink-jet ink, comprising:

from about 0.1 to about 6 wt % of at least one sulfonate surfactant having Formula I Formula I

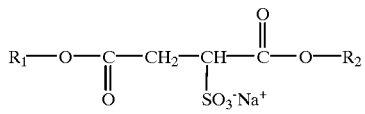

wherein $R_1$ and $R_2$ are independently selected from the group consisting of alkyls and aryls;

from about 0.1 to about 10 wt % of at least one alkoxylated polyhydroxy organic solvent;

from about 0.5 to about 30 wt % of at least one water-miscible organic solvent;

from about 0.1 to about 10 wt % of at least one hydantoin compound; and from about 0.1 to about 10.0 wt % of at least one branched $C_2$–$C_7$ alcohol.

19. A method for ink-jet printing, said method comprising the step of ejecting ink, said ink comprising:

at least one colorant; and an aqueous vehicle, the vehicle comprising
at least one anionic or nonionic surfactant;
at least one alkoxylated polyhydroxy organic solvent;
at least one water-miscible organic solvent; and
at least one hydantoin compound wherein the alkoxylated polyhydroxy solvent is an alkoxylated triol.

20. The method of claim 19 wherein said ink further comprises
at least one branched C2–C7 alcohol.

21. A method for ink-jet printing, said method comprising the step of ejecting ink, said ink comprising:

at least one colorant; and an aqueous vehicle, the vehicle comprising
at least one sulfonate surfactant having Formula I Formula I

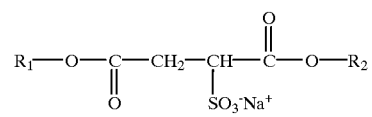

wherein $R_1$ and $R_2$ are independently selected from the group consisting of alkyls and aryls, at least one alkoxylated polyhydroxy organic solvent;

at least one water-miscible organic solvent, at least one hydantoin compound; and at least one branched C2–C7 alcohol.

22. The method of claim 21 wherein the alkyl group is C4 to C16, and the aryl group is unsubstituted or alkyl substituted phenyl or naphthalene group.

23. The method of claim 22 wherein the alkyl group is C5 to C14, and the aryl group is a phenyl or naphthalene group having C5 to C14 alkyl group substitutions.

24. The method of claim 21 wherein the at least one surfactant is present in a concentration from about 0.2 to about 4.5 wt %;

the at least one alkoxylated polyhydroxy organic solvent is present in a concentration from about 0.2 to about 7.5 wt %; and the at least one water-miscible organic solvent is present in a concentration from about 1 to about 20 wt %;

the at least one hydantoin compound is present in a concentration from about 0.25 to about 7.5 wt %; and the at least one branched $C_2$–$C_7$ alcohol is present in a concentration from about 0.25 to about 7.5 wt %.

25. An ink-jet ink for ink-jet printing, comprising:

at least one colorant; and an aqueous vehicle, the vehicle comprising
at least one sulfonate surfactant having Formula I

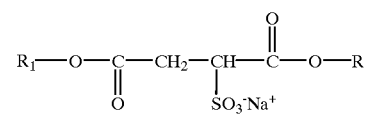

wherein R1 and R2 are independently selected from the group consisting of alkyls and aryls;
at least one alkoxylated polyhydroxy organic solvent, whererin the alkoxylated polyhydroxy solvent is an alkoxylated triol;
at least one water-miscible organic solvent;
at least one hydantoin compound; and
at least one branched $C_2$–$C_7$ alcohol.

26. A method for ink-jet printing, said method comprising the step of ejecting ink, said ink comprising:

at least one colorant; and an aqueous vehicle, the vehicle comprising
at least one sulfonate surfactant having Formula I

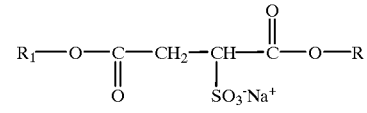

wherein R1 and R2 are independently selected from the group consisting of alkyls and aryls;

at least one alkoxylated polyhydroxy organic solvent, wherein the alkoxylated polyhydroxy solvent is an alkoxylated triol;

at least one water-miscible organic solvent;

at least one hydantoin compound and at least one branched C2–C7 alcohol.

* * * * *